United States Patent [19]
Imafuji et al.

[11] Patent Number: 5,619,294
[45] Date of Patent: Apr. 8, 1997

[54] CAMERA WITH A VISUAL LINE POSITION DETECTION DEVICE AND METHOD

[75] Inventors: Kazuharu Imafuji; Shigemasa Sato; Toru Kosaka; Hidehiro Ogawa, all of Kanagawa-ken, Japan

[73] Assignee: Nikon Corporation, Tokyo, Japan

[21] Appl. No.: 414,993

[22] Filed: Mar. 31, 1995

[30]    Foreign Application Priority Data

Apr. 21, 1994  [JP]  Japan .................................. 6-083301

[51] Int. Cl.⁶ ........................... G03B 13/02; G03B 13/10
[52] U.S. Cl. ............................................. 396/51; 396/378
[58] Field of Search ..................................... 354/219, 222

[56]                References Cited

U.S. PATENT DOCUMENTS

| | | | |
|---|---|---|---|
| 4,217,048 | 8/1980 | Egawa | 354/199 |
| 4,950,069 | 8/1990 | Hutchinson | 351/210 |
| 5,036,347 | 7/1991 | Tsunekawa et al. | 354/219 |
| 5,150,143 | 9/1992 | Ohno et al. | 354/222 |
| 5,335,035 | 8/1994 | Maeda | 354/219 |
| 5,345,287 | 9/1994 | Taguchi | 354/221 |
| 5,400,101 | 3/1995 | Yoneyama et al. | 354/222 |

*Primary Examiner*—Safet Metjahic
*Assistant Examiner*—Michael Dalakis
*Attorney, Agent, or Firm*—Oliff & Berridge

[57]                ABSTRACT

A camera with a visual line position detection device capable of highly accurate determinations even when diopter adjustment is accomplished after initial completion of correction of the visual line position determining system. The camera includes a screen to form a subject image, a pentagonal prism provided inside the finder, a visual line position detection device equipped with a light emitting unit and a light receiving unit to detect the visual line position, and a diopter adjustment lens placed on the photographer's side of the pentagonal prism. The diopter adjustment lens is displaced after the correction of the visual line position detection device, and a correction coefficient needed to compute the visual line position on the screen obtained during the correction of the visual line position detection device is changed according to the displacement amount of the diopter adjustment lens.

13 Claims, 9 Drawing Sheets

CAMERA WITH A VISUAL LINE POSITION DETECTION DEVICE AND METHOD

BACKGROUND OF THE INVENTION

1. Field of the Invention

The present invention relates to a camera with a visual line position detection device that determines a photographer's visual line position and executes auto focus adjustment, auto exposure, and/or switching of shooting modes, based on the detected visual line position.

2. Description of Related Art

In recent years, with the development of electronic circuits and the photoelectric conversion device, automation and multi-functionality of cameras has progressed. Today, functions such as auto exposure detection and auto focus detection are provided in most cameras. Due to such automation and multi-functionality in cameras, photographers without much experience or advanced shooting skills are beginning to be able to take pictures with increased success.

On the other hand, because of the automation and multi-functionality of cameras, some shooting functions are sometimes restricted. Such restrictions result from the fact that adjustments of auto exposure and auto focus are structured to function for only part of the finder field.

In other words, in the case of auto exposure, appropriate exposure is established for most of the subjects by using a multi-photometry technique, etc., wherein the shooting field is divided into several areas, selection of the area to be established for appropriate exposure being accomplished based upon a measured difference between the absolute value of the photometric value of each area and the photometric value of the other areas.

On the other hand, in the case of auto focus adjustment, most cameras are structured in such a manner that auto focus adjustment is possible only in the middle of the finder field. As a result, if a subject for which focus detection is desired to be performed is not in the middle of the finder field, a shooting technique is necessary wherein focus detection is executed on the desired subject first, and then, maintaining the conditions intact, the framing is changed to take the picture.

In recent years, in order to avoid the maneuver described above, a camera has been invented wherein several points for auto focusing are provided in the finder field so that one of these points may be selected for auto focus adjustment.

Two known selection methods of a point in which auto focus adjustment are: (1) a method of using a microprocessor to automatically select a point by measuring the distance to each auto focus adjustment point and to use the distance obtained between each point and the subject, and (2) a method in which a point is selected manually by adjusting a command dial while watching the field.

Also, a method is known in which the point described above is selected by detecting and using the visual line position of the photographer. In this case, the photographer, while viewing through the finder, aligns his vision with a visual line position or point where he desires to execute auto focus adjustment, and a visual line position determinating device determines the visual line position and selects the point closest to the visual line position detected.

The selection method based on the visual line position described above is not limited to auto focus detection, but can be applied in a similar manner to change the settings of the camera, such as exposure mode and shutter speed, by establishing various areas on the screen field and having the photographer align his vision with an appropriate area.

A visual line position detection device is known, for example, wherein a reflected image of an eyeball, obtained when the photographer's eye surface is illuminated, is detected by a CCD sensor, the visual line position being determined by numerically converting the position on the sensor to a position in the field.

In determining the photographer's visual line position in the manner described above, sometimes the position in the finder field where the photographer is actually aligning his vision and the position of the visual line in the field determined by the visual line position detection device differ. In such a situation, it becomes necessary to correct the positional error between the visual line position point of the photographer and the visual line position determined by the visual line position detection device.

As a correction method in a visual line position detection device, a method is known wherein the photographer's line of sight is made to be aligned with a specified point on the finder screen. The visual line position detection device determines the photographer's visual line while maintaining the photographer's visual line position and corrects conversion coefficients from the sensor output of the visual line position detection device to the visual line position based on the difference in positions of the point detected in the finder field and the specified point to which the photographer aligns his vision.

On the other hand, there are cases in which the subject image is not clearly observed on the screen, depending on the difference in the diopter of photographers and on whether or not correction is made for eyeglasses or contact lenses. In such cases, the diopter needs to be adjusted in the finder, etc., of the camera.

As a method of diopter adjustment, several conventional methods are known, such as a method in which the eyepiece is changed to a lens matching the diopter and a method in which the diopter is adjusted by providing a movable diopter adjustment lens within the finder and by moving the diopter adjustment lens forward and backward in the direction of the optical axis.

However, with the conventional methods described above, the diopter adjustment lens is positioned between the photographer's eye and the sensor of the visual line position detection device and the screen field. Because of this, problems occur. For example, if a photographer with eyeglasses removes the glasses and executes diopter adjustment after correction of the visual line detection system is completed, the position of the diopter adjustment lens changes and the visual line detection system erroneously detects a point different from the photographer's actual line of vision.

SUMMARY OF THE INVENTION

An object of the present invention is to provide a camera with a visual line position detection device capable of determining the visual line position very accurately even when diopter adjustment is performed after correction of the visual line position detection device is completed.

The described object is accomplished by providing a camera with a visual line position detection device wherein the visual line position detection device determines the position of a photographer's visual line. A diopter adjustment lens adjusts the photographer's diopter; a lens position detection device detects the displacement amount of the diopter adjustment lens on the optical axis; and a visual line position correction device, including the visual line position detection device, corrects the visual line position so that the photographer's actual visual line position and the position of the determined visual line will coincide even if the position of the diopter adjustment lens is displaced from a position where a first correction has been determined. The error produced due to the displacement will be eliminated based on the displacement amount of the diopter adjustment lens caused by the displacement detected by the lens position detection device.

In a camera with the visual line position detection device of the present invention, a visual line position correction device corrects the error between the line of vision position in the shooting screen to which the photographer's vision is aligned and the visual position in the shooting field detected by the visual line position detection device.

If the position of the diopter adjustment lens on the optical axis is changed for diopter adjustment after correction of such a visual line position detection device, the visual line position detected by the visual line position detection device changes even if the visual axis direction of the photographer's eye does not change unless proper correction is made.

According to the camera of the present invention, the lens position detection device detects the position of the diopter adjustment lens. Then, the visual line position correction device uses the detected displacement amount of the diopter adjustment lens to perform a correction of the visual line position detection device to eliminate the error of the visual line position detection device caused by the displacement of the lens.

BRIEF DESCRIPTION OF THE DRAWINGS

An embodiment of a camera with the visual line position detection device of the present invention is described hereafter, with reference to the drawings, in which.

DETAILED DESCRIPTION OF PREFERRED EMBODIMENTS

Figure 1:
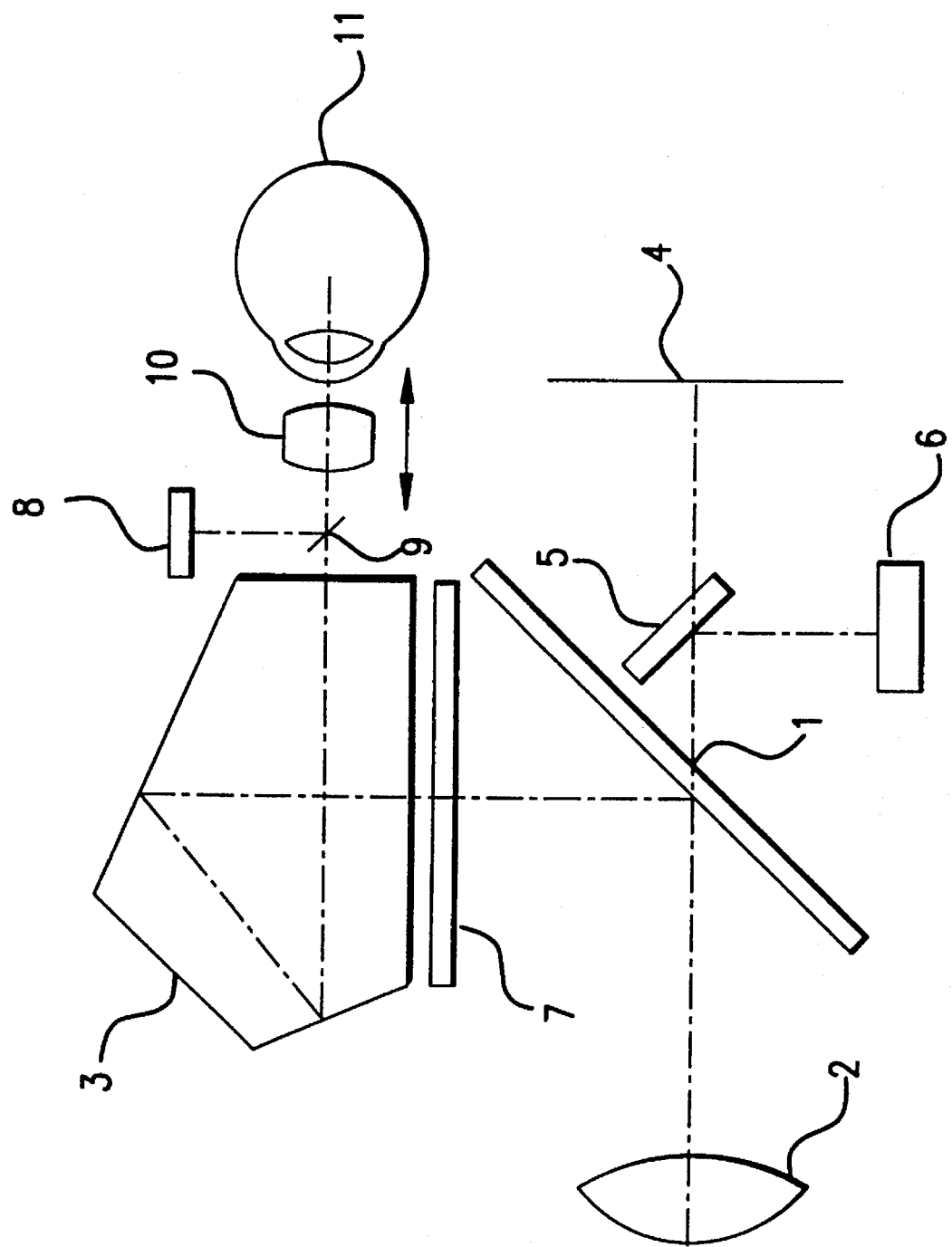
FIG. 1 is an illustration showing a section of the structure of a single lens reflex camera in an embodiment of the present invention.

FIG. 1 illustrates a section of a structure of the embodiment in which the present invention is applied to a single lens reflex camera;

The camera of the present embodiment comprises, as illustrated in FIG. 1, a shooting lens 2, a main mirror 1 that deflects the light introduced through the lens 2, a shooting field screen 7 that receives the light from the main mirror 1, a pentagonal prism 3 that directs the light guided by the main mirror 1 toward a finder, a visual line position detection device 8 equipped with light emitting and light receiving units to detect the visual line, a half mirror 9 that combines the light from the light emitting unit of the visual line position detection device 8 and the light from the pentagonal prism 3 and reflects the combined light to the eye 11 of the photographer, and a diopter adjustment lens 10 that is placed between the half mirror 9 and the eye 11 and that adjusts the diopter.

The main mirror 1 usually guides the light from the lens 2 toward the pentagonal prism 3 as described above, but it is retracted from that position of placement during shooting so that the light passes to the film surface 4.

The visual line position detection device 8 optically determines the visual axis of the eye section (eyeball) 11 and comprises, for example, a light emitting unit with an LED to generate light to be projected onto the eye section 11, a light receiving unit with a CCD sensor to detect the light reflected by the eye 11, and a visual line algorithm unit to determine the visual line position by converting the output signals from the light receiving unit into a position on the screen.

The diopter adjustment lens 10 is placed such that it moves forward and backward along the direction of the optical axis of the light directed by the pentagonal prism 3. With this structure, an image on the screen 7 in the finder is clearly observed by adjusting the diopter of the photographer.

The present embodiment further comprises an auto focus detection system 6 and a sub-mirror 5 that directs the light passing through the main mirror 1 to the auto focus detection system 6.

The auto focus detection system 6 determines the defocus amount of the subject based on the light directed by the sub-mirror 5 and performs focus detection of the subject image by driving an auto focus adjustment lens.

Figure 6:
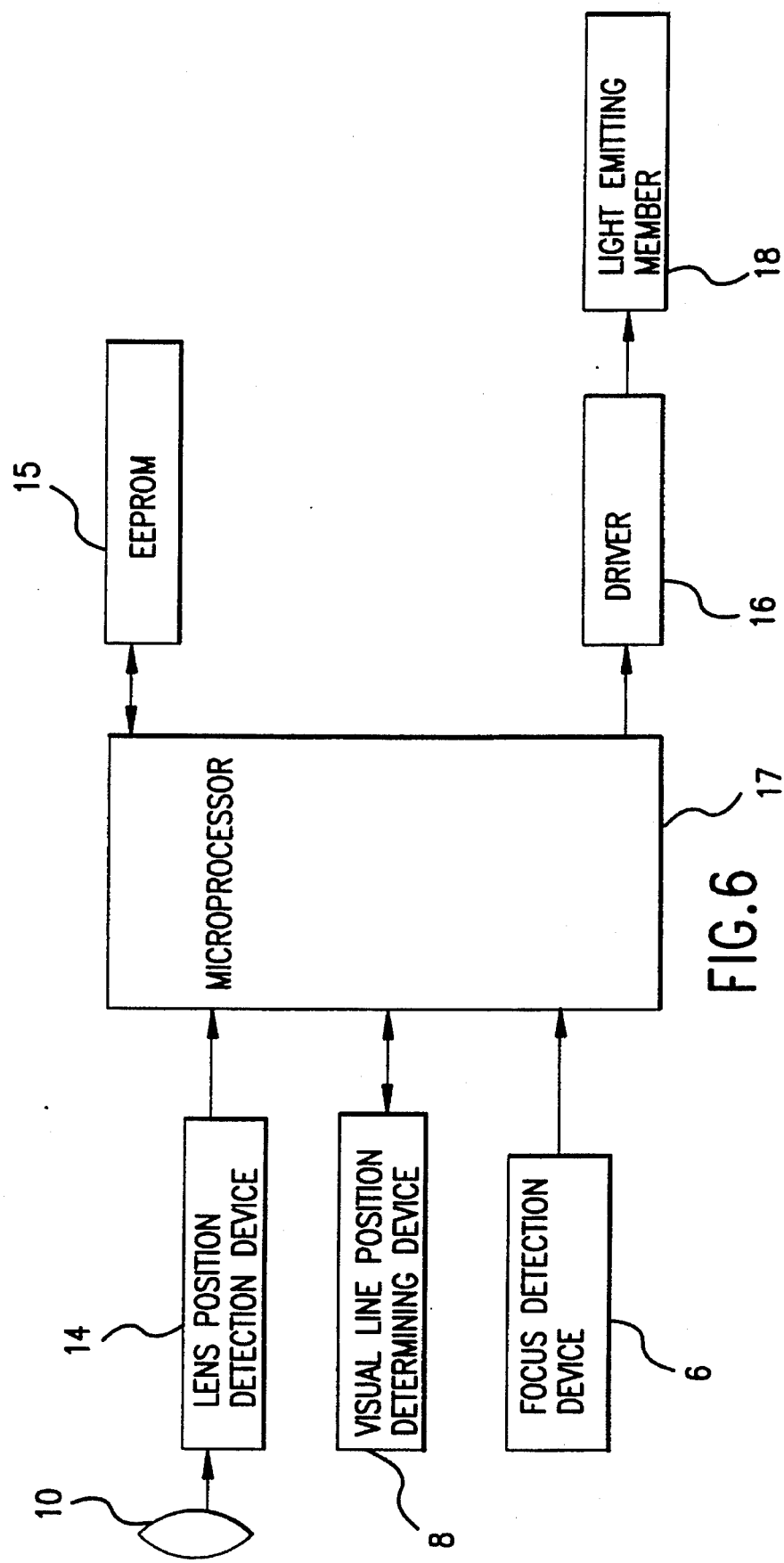
FIG. 6 is a block diagram showing an example of a functional block structure of the present invention.

Next, the functional block structure of the present embodiment will be described with reference to block diagram of FIG. 6.

In addition to the structure described above (see FIG. 1), the present embodiment comprises a memory (EEPROM) 15 to store the value of the correction coefficient (correction amount) necessary for visual line detection and to store the position of the diopter adjustment lens 10, a lens position detection device 14 to detect the position of the diopter adjustment lens 10 on the optical axis, a screen display light emitting member 18 to display at a specified position on the screen 7, a driver 16 to light the light emitting member 18, and a microprocessor 17 to control the operation of each unit above, all of which will be described in detail hereinafter.

The lens position detection device 14 detects the displacement of the absolute position or the relative position of the diopter adjustment lens 10 on the optical axis and inputs a signal indicating the position into the microprocessor 17. The visual line position detection device 8, as explained hereinafter, detects the visual line of the photographer, computes the position of the visual line on the screen 7, and inputs the position information to the microprocessor 17.

The microprocessor 17 writes on the EEPROM 15 the values of correction coefficients of the visual line position detection device 8 obtained at the time of correction and the position of the diopter adjustment lens 10 at the time of determining the values of the correction coefficients, and, in the case of a new visual line determination, executes correction of the visual line position detection device 8 by reading from the EEPROM 15 the correction coefficients and the position of the diopter adjustment lens 10 and by outputting these values to the device 8. Moreover, the microprocessor 17 lights up the light emitting member 18, made of an LED for example, on the screen 7 by means of the driver 16 to screen-display the visual line position on which the photographer is directing his vision during visual line correction.

The visual line position detection device 8, EEPROM 15 and microprocessor 17 comprise the visual line position correction device.

The visual line detection operation according to the present embodiment will be explained next.

Figure 2A:
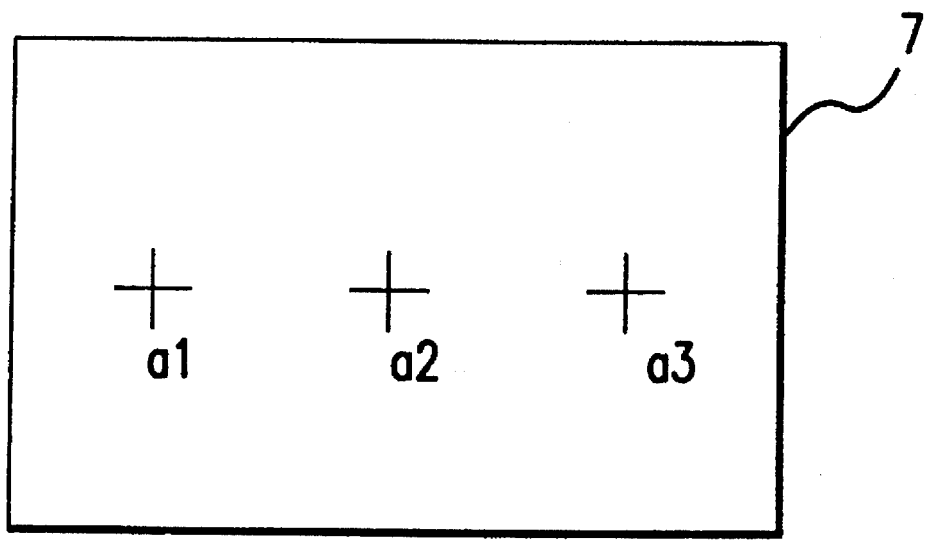
FIG. 2(a) is an illustration showing a display inside the finder in the embodiment of FIG. 1.
Figure 2B:
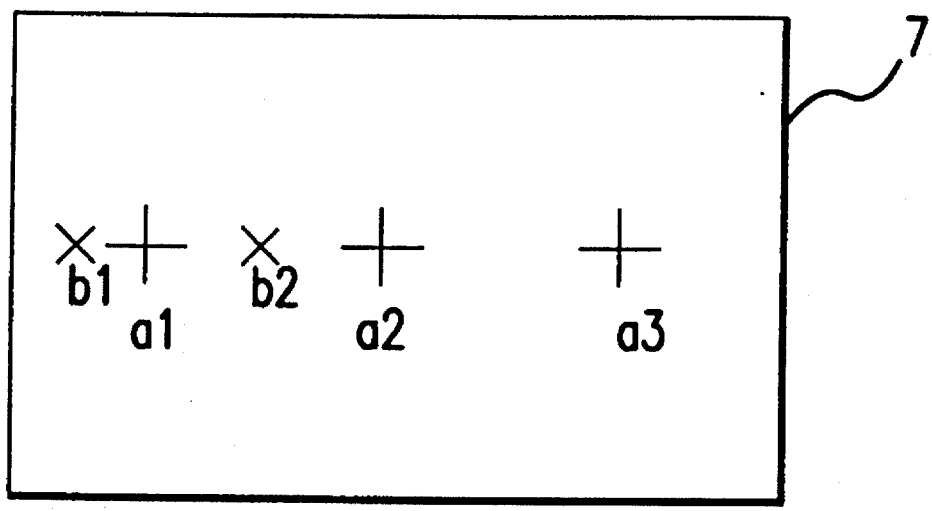
FIG. 2(b) is an illustration showing another display inside the finder in the embodiment of FIG. 1.

FIG. 2 illustrates the conditions of the screen 7 that the photographer observes when the photographer looks through the finder in the present embodiment, in which auto focus detection of the subject is accomplished at one of the points out of a set of predetermined points at which auto focus detection is possible, such as points a1, a2, and a3 illustrated in FIG. 2(a).

Here, points a1, a2 and a3 will be recognized by the photographer as the light emitting member 18 is driven by the driver 16, for example, causing images with a specified shape (a cross in FIG. 2 in the present embodiment) to be projected on the specified position on the screen 7.

Selection methods of a point among these points on which auto focus detection is to be accomplished include a method in which the microcomputer determines the point automatically using the distance to the subject image and the illumination of the subject or background, a method in which the photographer selects manually using a command dial that accepts instructions from the photographer, for example, and a method in which the point is selected by having the photographer align his vision with one of the points among points a1, a2 and a3.

The present embodiment adopts the last method above in which selection is accomplished by the point being selected based on the visual line of the photographer. Here, during detection operation by the visual line position detection device 8, assume that the photographer visually aligns his vision with point a1 to perform auto focus detection at point a1. However, the visual line position detection device 8 detects a point b1 different from point a1 as the position of the visual line of the photographer (see FIG. 2(b)).

A major reason for such a shift in positions of the visual line detected and the actual visual line is not a mechanical error of the visual line position detection device 8 but a result of the difference in the structure of the eye 11 of individual photographers. In other words, the visual line position detection device 8 detects the visual line from the direction of the photographer's eye 11, but the radius of curvature of the cornea of the eye 11 differs for each photographer, and in general, the detected direction of the visual axis and the actual direction of the visual axis do not coincide. The visual line detection device 8 may include standard settings, but if the photographer does not satisfy the standard characteristics of the eye 11, the visual position detected and the actual line of vision position will differ.

Even if error in detection occurs as described above, if the error is small (point b1), naturally, the position of auto focus detection intended by the photographer (point a1) can be selected.

However, if the error is large and point b2, located between point a1 and point b2 for example, is detected although the photographer is aligning his vision with point a1, point a2 may be selected depending on the distance from point a1, and point a1 on which the photographer intends to perform auto focus may not be selected.

In using the visual line position detection device 8, due to detection errors caused by the particular photographer's eye 11, as described above, the actual visual line position of the photographer will sometimes differ from the visual line position determined by the visual line position detection device 8. Thus, it becomes necessary to correct the visual line position detection device 8.

Figure 3:
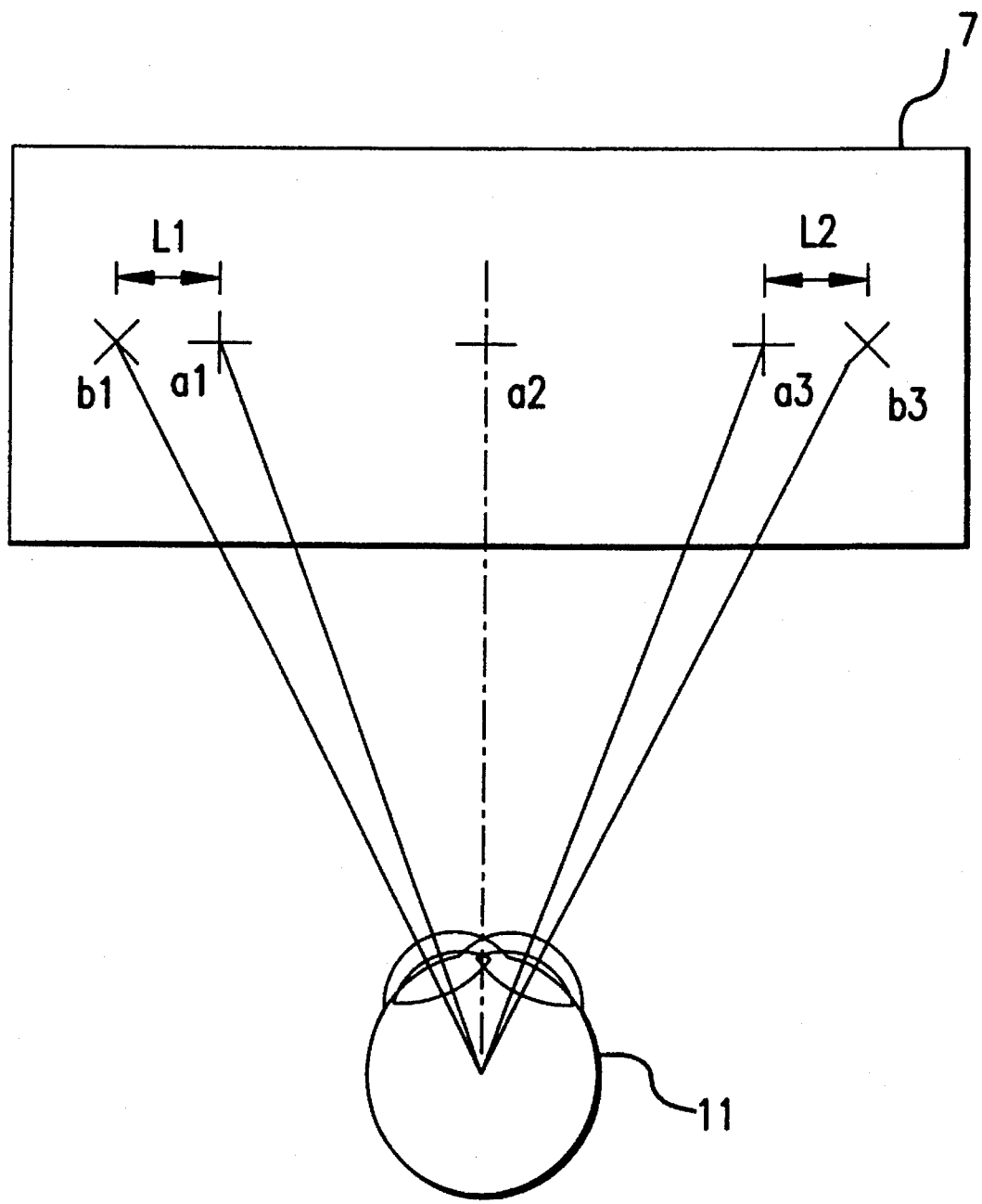
FIG. 3 is an illustration showing a display inside the finder and the visual line direction of the photographer in the present invention.

Hereinafter, an example of the correction method of the visual line detection device 8 will be described with reference to FIG. 3.

With the present embodiment, the photographer's eye 11 aligns his vision with one of points a1, a2 and a3 on which auto focus detection is possible on the screen 7, and the auto focus detection position is determined by detecting the visual line position using the visual line detection device 8.

During visual line detection, the visual line position detection device 8 illuminates the photographer's eye section 11 by emitting light from the light emitting unit, and the light receiving unit receives the light reflected by the surface of the eye section 11 forming the reflection image, Purkinje image, of the eyeball. In this instance, the angle of the rotation of the eyeball, indicating the visual line of the photographer, is proportional to the displacement of the position of the Purkinje image on the CCD sensor of the light receiving unit. Moreover, the position on the CCD sensor is proportional to the position of the visual line on the screen 7.

Therefore, the relationship between the position on the CCD sensor that provides an output and the position of the visual line on the screen 7 is obtained beforehand, and the visual line algorithm unit receives the output of the CCD and computes the position of the visual line on the screen 7 using the predetermined relationship and the position of Purkinje image on the CCD sensor. In this instance, an error L1 is computed between the photographer's visual alignment point a1 and point b1, the position of the visual line thereby being detected.

Similarly, point a3 is illuminated for several seconds so the photographer visually aligns with point a3 on the screen 7. While the photographer visually aligns with point a3, the visual line position detection device 8 detects the visual line of the photographer. In this instance, an error L2 is computed between the photographer's visual alignment point a3 and point b3, the position of the visual line detected.

According to the present embodiment, the correction of the visual line position detection device 8 is accomplished based upon errors L1 and L2 obtained by the method described above. Suppose, for example, that, as indicated in FIG. 1, the relationship between the position X on the CCD sensor, obtained by converting the output signals from the CCD sensor in the visual line position detection device 8, and the visual line position Y is defined by the following equation:

$$Y = m \cdot X + n \tag{1}$$

Here, m and n are correction coefficients assuming different values depending on the characteristics of the photographer's eye 11.

Thus, two visual line position determinations are required to determine the values of correction coefficients m and n.

Figure 9:
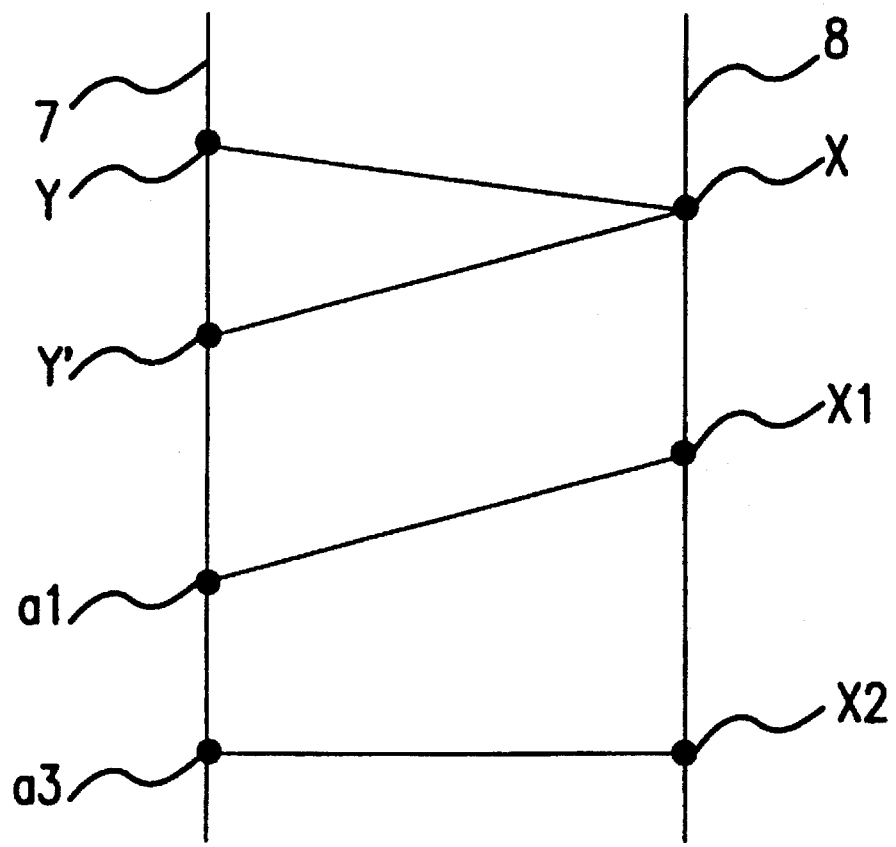
FIG. 9 is a diagram that shows the correspondence of positions of detection on a sensor and line of sight positions on a screen in the embodiment of FIG. 1.

In performing correction of the visual line position detection device 8, the values of correction coefficients m and n are computed using the errors L1 and L2 obtained above and, as shown in FIG. 9, the positions X1 and X2 on the CCD sensor when the photographer visually aligns with points a1 and a3 and stores the values of the correction coefficients in the EEPROM 15. Also, the position of the diopter adjustment lens at the time of correction detected by the lens position detection device 14 is stored in the EEPROM. The lens position is used for correction of errors produced by diopter adjustment after the primary correction, to be explained later.

According to the present embodiment, the visual line position detection device 8 can select the auto focus detection position intended by the photographer by executing correction as described above before the shooting operation and by reading and using the stored correction amount during visual line position determination.

Figure 4:
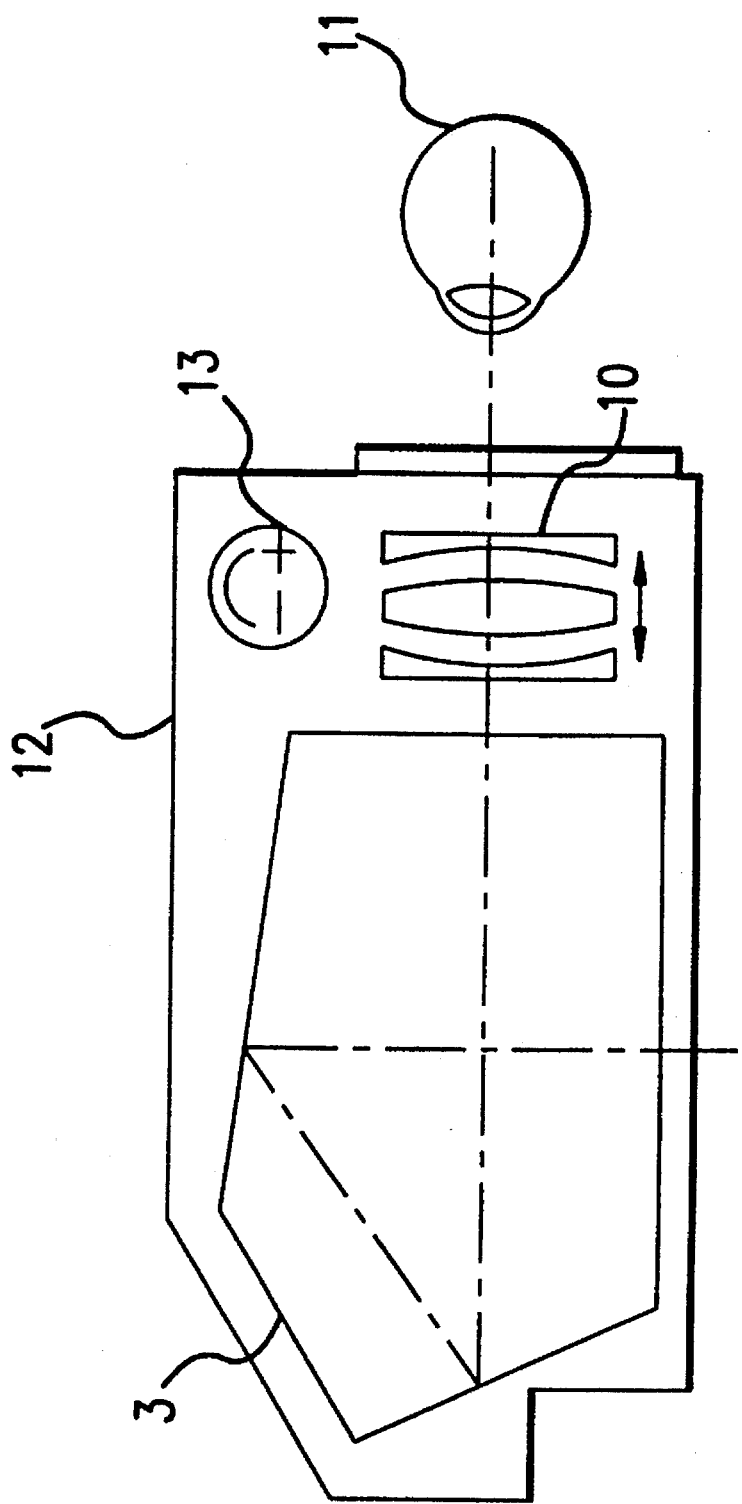
FIG. 4 is an illustration showing an example of a structure of a finder in a single-lens reflex camera of the present invention.

The diopter adjustment operation and correction of detection errors produced by diopter adjustment operation after correction of the visual line position detection device 8 in the present embodiment are explained hereafter with reference to FIG. 4. In this instance, FIG. 4 illustrates a cross section of the structure around the finder in the camera.

Light deflected by the main mirror 1 (see FIG. 1) forms an image on the screen 7. The light path of the subject image thus formed is changed by the pentagonal prism 3 in the finder 12 and enters the eye 11 of the photographer through the diopter adjustment lens 10. In this instance, the eye of the photographer may not focus on the subject image formed on the screen 7 due to a difference of the diopter of the photographer, or based on whether correction has been made for the photographer's eyeglasses or contact lenses. In such cases, it becomes necessary to make corrections with the diopter adjustment lens 10 so that the subject image composed on the screen 7 may be observed clearly.

According to the present embodiment, the diopter adjustment lens 10, the diopter adjustment dial 13 to move the diopter adjustment lens 10 back and forth in the direction of the optical axis, and a lens driving member to convert the rotation motion of the dial 13 to a displacement motion of the lens 10 in the direction of the optical axis are provided in the finder 12. The diopter lens 10 is caused to move back and forth in the direction of the optical axis through the rotation of the diopter adjustment dial 13.

Here, the lens position detection device 14 detects the position of the lens 10, for example, by directly detecting the position of the lens 10 on the optical axis or by detecting the angle of the diopter adjustment dial 13 at the time of placement.

While looking through the finder 12, a photographer observes a subject image and focuses the camera on the subject. Then, the photographer adjusts the diopter by rotating the diopter adjustment dial 13 to a position where the subject image can be observed clearly.

However, the adjustment of the position of the diopter adjustment lens 10 in this manner causes a large determination error of the visual line position on the screen 7 by the visual line position detection device 8, and a problem occurs of not determining the auto focus detection position aligned with the visual line of the photographer. The cause of this problem is explained with reference to FIG. 5.

Figure 5:
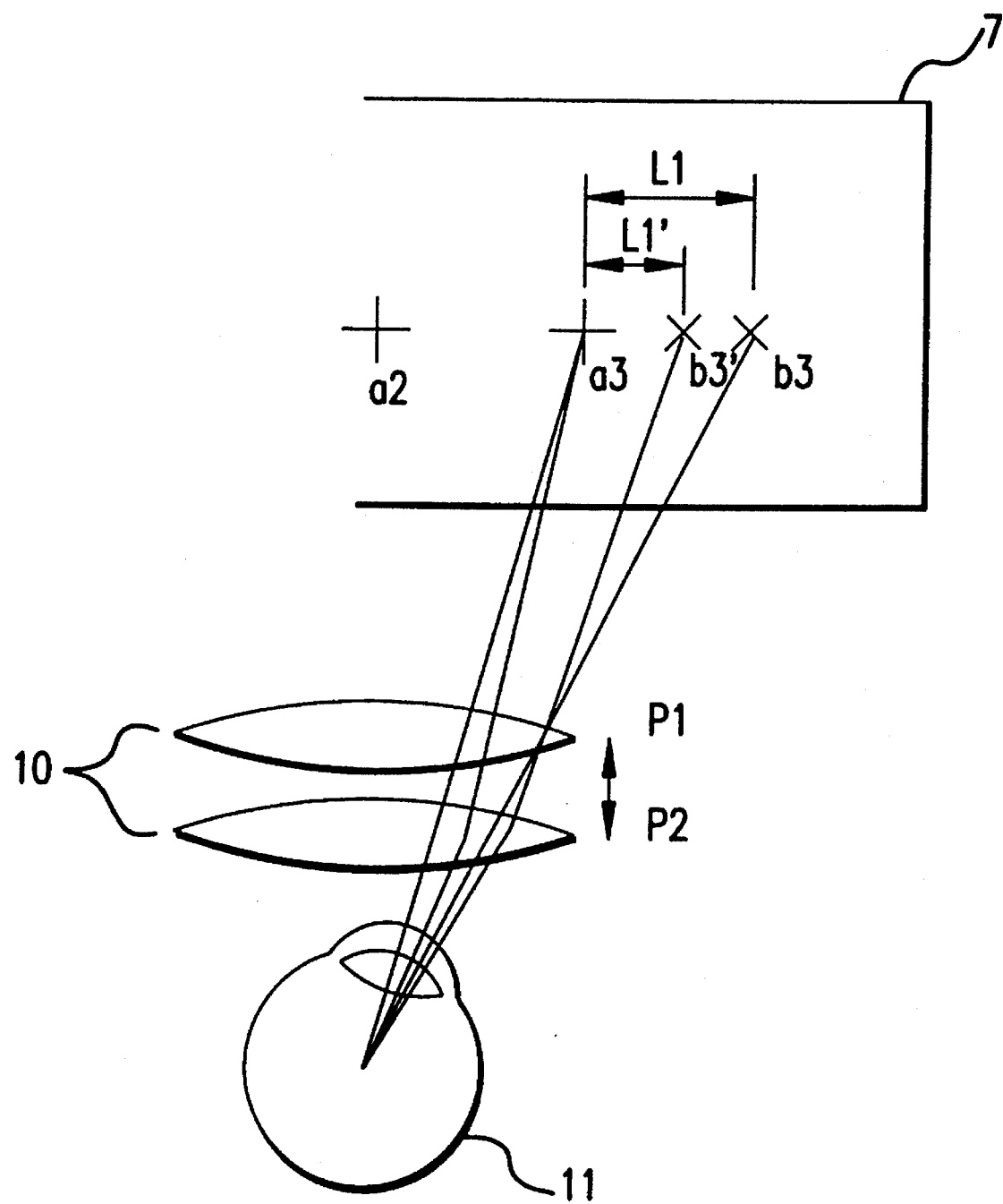
FIG. 5 is an illustration showing the display inside the finder and the visual line direction of the photographer in the present invention.

As illustrated in FIG. 5, when correction of the visual line detection device 8 is accomplished with the diopter lens being positioned at P1, the photographer aligns his vision with a visual line position at point a3 on the screen 7, and the visual line position detection device 8 executes its determination with point b3 as the visual line position. In this instance L1 is designated as the determination error associated with the determination.

Subsequently, the photographer adjusts the diopter using the diopter adjustment lens 10, causing the position of the diopter adjustment lens to shift from P1 to P2. At this time, even if the photographer visually aligns with point a3 on the screen 7, the position of the visual line on the screen 7 detected by the visual line position detection device 8 is b3', and the resulting error is L1'.

In other words, even if the photographer visually aligns with point a1, the position of the Purkinje image on the CCD sensor of the visual line detection device 8 changes due to the shift in the position of the diopter adjustment lens 10. As a result, the visual line position Y computed by the visual line algorithm unit using the equation (1) above is different from the actual visual alignment position.

Therefore, according to the present embodiment, the relationship between the displacement amount of the diopter adjustment lens 10 and the correction amount obtained during correction of the visual line position determining 8 is pre-established, the relationship being used to convert the position of the Purkinje image on the CCD sensor to the visual line position on the screen 7 during computation of the visual line algorithm by means of the visual line position detection device.

The visual line position correction device, which includes visual line position detection device 8, EEPROM 15 and microprocessor 17, provides a correction to the determined visual line position based on the displacement amount of the diopter adjustment lens 10.

In actuality, the visual line position Y', shown in FIG. 9, with the changed position of the diopter adjustment lens 10 after correction of the visual line position detection device 8 is obtained from the visual line position Y defined by means of equation (1) above and the lens position coefficient A whose value is determined by the displacement amount of the diopter adjustment lens 10 based on, for example, the following equation:

$$Y' = A \cdot Y = (A \cdot m) \cdot X + (A \cdot n) \tag{2}$$

According to the present embodiment, in order to determine the value of A, the position of the diopter adjustment lens 10 detected by the lens position detection device 14 at the time of correction of the visual line position detection device 8 is combined with the values of correction coefficients m and n in equation (1) above, and the results are stored in the EEPROM 15. Next, in the determination of the visual line executed after displacement of the diopter adjustment lens and after correction, the microprocessor 17 reads the values of the correction coefficients and the position of the diopter adjustment lens 10, and the lens position detection device 14 detects the position of the lens 10 at this juncture.

The value of lens position coefficient A is determined from the difference between the position of the diopter adjustment lens 10 during correction read by the microprocessor 17 and the position after the displacement of the lens 10. The visual line algorithm unit of the visual line position detection device 8 computes the visual line position from the value of coefficient A and the values of correction coefficients m and n read by the microprocessor 17 using equation (2) above.

The operation process of the present embodiment is explained next.

Figure 7:
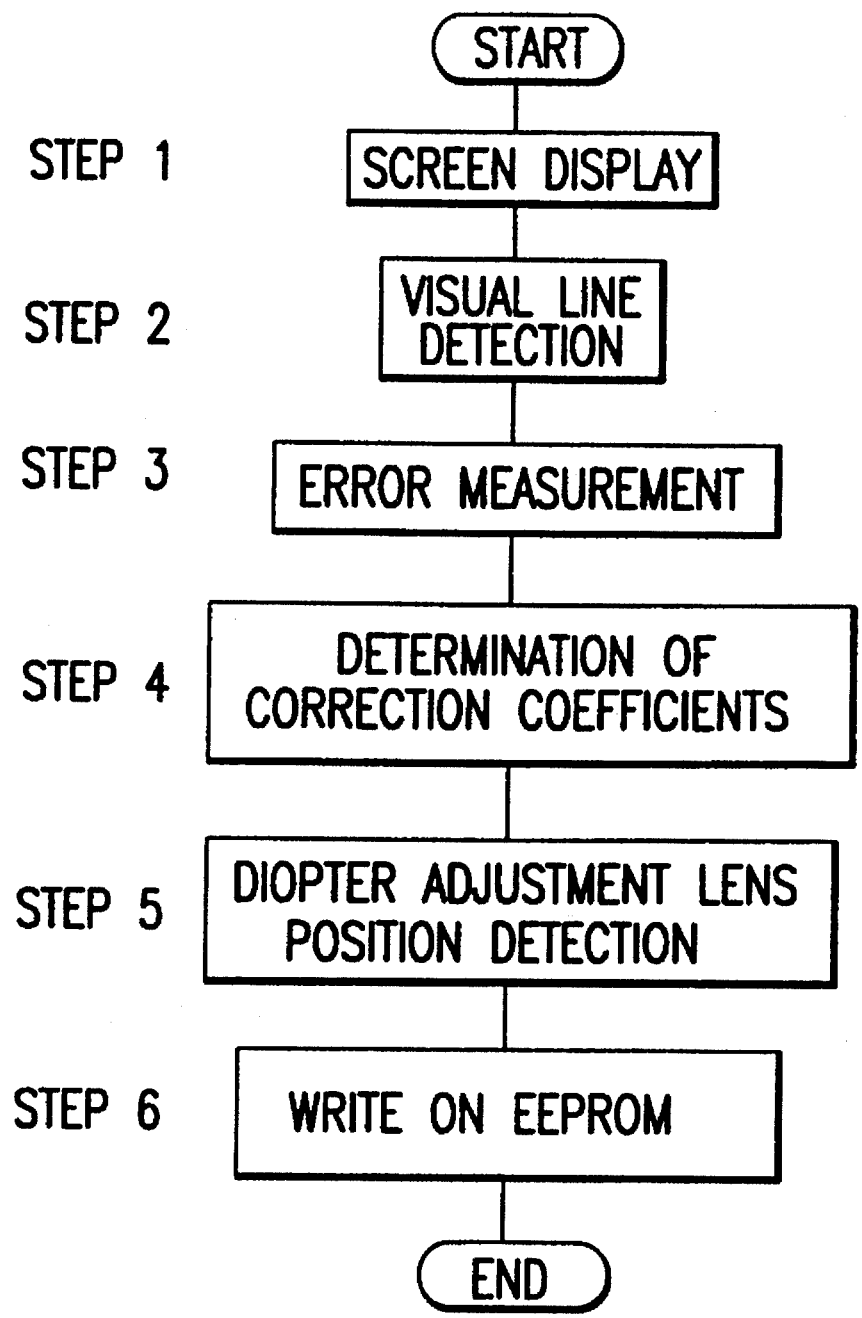
FIG. 7 is a flow chart showing an example of a process at the time of visual line correction by a camera of the present invention.

The process relating to correction of the visual line position detection device 8 is explained using flow charts in FIG. 7. The present process begins, for example, by setting the operation mode of the camera to the correction mode of the visual line position detection device 8.

First, the specified points among all the points on the screen 7 on which auto focus detection is possible are displayed by the driver 16 (STEP 1), and detection of the visual line position of the photographer is executed by the visual line position detection device 8 while the points are flashed one after another for the photographer to visually align on (STEP 2).

Next, each error between the points on the screen 7 displayed at STEP 1 and the visual line positions of the photographer detected at STEP 2 is measured (STEP 3), and, based on these errors, the values of correction coefficients m and n to be used in equation (1) above are determined (STEP 4).

STEP 1–STEP 4 provide visual line position determinations of the values of correction coefficients m and n to be later used for other visual line position determinations.

Next, the position of the diopter adjustment lens 10 is detected by the lens position detection device 14 (STEP 5).

The values of the correction coefficients of the position computed at STEP 4 and the data of the position of the diopter adjustment lens 10 detected at STEP 5 are written on the EEPROM 15 (STEP 6).

Figure 8:
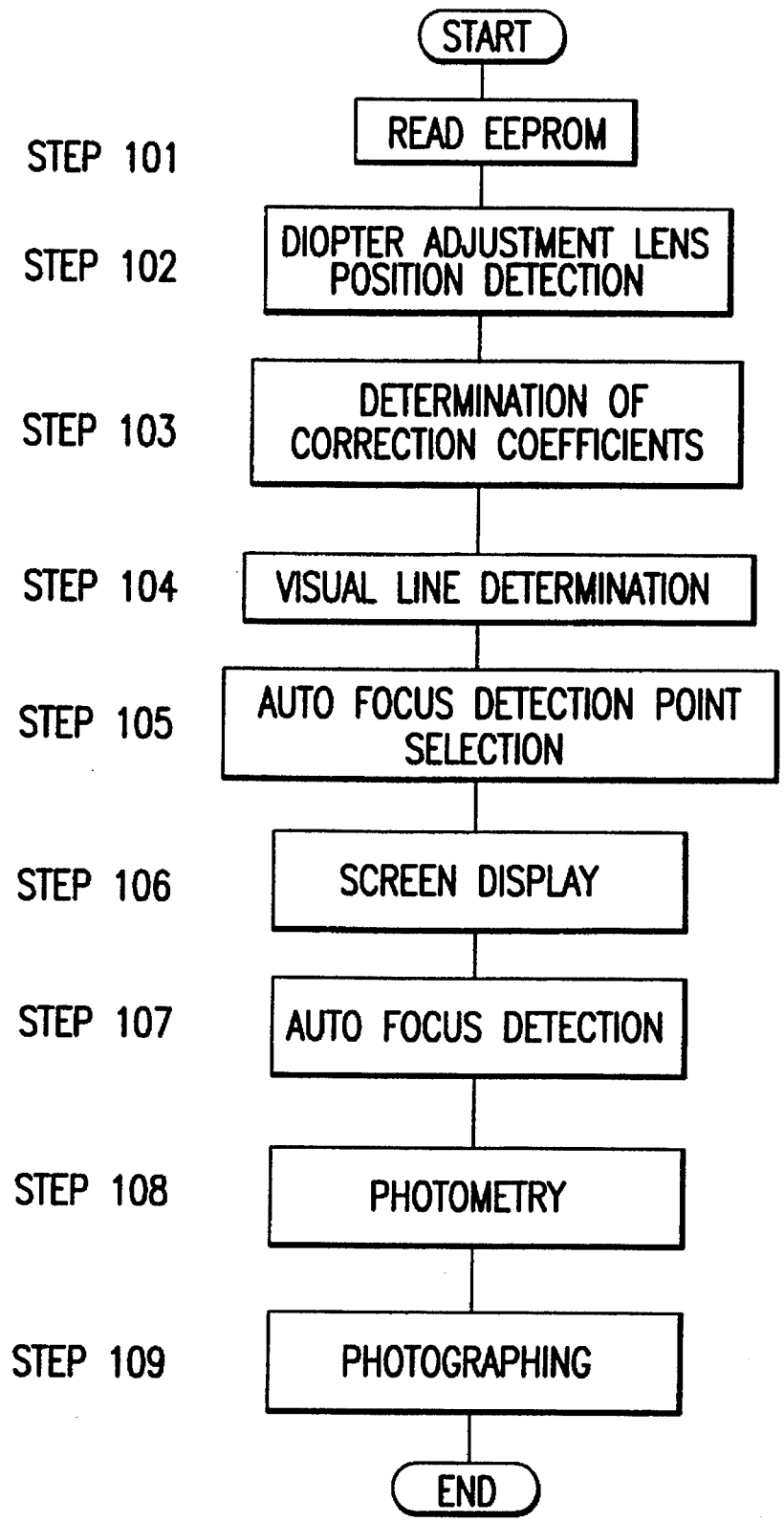
FIG. 8 is a flow chart showing an example of a process at the time of picture taking by a camera of the present invention.

Next, the process in the present embodiment is explained using flow charts in FIG. 8 when photographing takes place after the position of the diopter adjustment lens 10 changes after the correction described above. The present process begins, for example, by setting the operational mode of the camera to the shooting mode and by turning the switch ON by half-depressing the release button in the camera.

First, the values of the correction coefficients of the visual line position detection device 8 and the position of the diopter adjustment lens 10 at the time of computing the correction amounts that are written in the EEPROM 15 are read (STEP 101). Then, the current position of the diopter adjustment lens 10 is detected by the lens position detection device 14 (STEP 102).

Next, from the distance between the current position of the diopter adjustment lens 10 detected and the position of the diopter adjustment lens at the time of correction, the value of lens position coefficient A is determined using equation (2) above, and, based on the values of the correction coefficients read from the EEPROM 15, the values of the adjusted correction coefficients Am and An corresponding to the current position of the diopter adjustment lens 10 are computed (STEP 103). Based on these values, determination of the visual line position of the photographer is executed by the visual line position detection device 8 (STEP 104).

Based upon the detected visual line position of the photographer, a point is selected from the points on the screen 7 where auto focus detection is to be made (STEP 105), and the selected point where focus detection is to be executed is displayed on the screen 7 by the driver 16 (STEP 106). Then, auto focus detection is executed at the point selected (STEP 107), and illumination of the subject is detected (STEP 108).

Finally, after the release button press switch turns ON, the picture is taken by executing stop down, mirror-up, and shutter opening and closing (STEP 109). The present process is completed by returning the aperture and the mirror to the beginning condition.

According to the present embodiment, the correction amount obtained at the time of visual line detection is changed according to the position of the diopter adjustment lens 10, thus preventing an erroneous detection of the visual line even if the diopter is adjusted after the correction. Moreover, storing of the correction amount of visual detection is not necessary for each diopter adjustment, thus eliminating unnecessary operations by the photographer.

In the present embodiment, a situation is presented with three points that are placed linearly and on which auto focus detection is possible, but the present invention is not limited to the described embodiment. For example, even if the multiplicity of points is scattered on a plane on which auto focus detection is possible, correction of the visual line position detection device can be accomplished in a similar manner as in the present embodiment by taking the effect of the diopter adjustment lens into consideration.

In the present invention, it is possible to provide a camera with a visual line position detection device wherein, even if diopter adjustment is accomplished after correction of the visual line position detection device, the visual line is determined with a high degree of accuracy without further correcting the shift between the visual line position of the photographer and the visual line position detected by the visual line position detection device.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera, comprising:

a diopter adjustment lens movable along an optical axis;

means for detecting a position of said diopter adjustment lens along said optical axis;

means for determining a distance between a first position and a second position of said diopter adjustment lens;

means for making visual line position determinations with said lens at said first position; and means for determining a visual line position at said second position based on (1) said visual line position determinations, and (2) the distance between said first position and said second position of said diopter adjustment lens;

means for determining a lens position coefficient from said distance, wherein, when said lens is at said second position, said means for determining a visual line at said second position determines said visual line position based on said lens position coefficient;

means for determining correction coefficients for correcting determinations of visual line positions perpendicular to the optical axis, wherein values of said correction coefficients depend on characteristics of a photographer eye in said first position;

means for adjusting at least one of said correction coefficients when said diopter adjustment lens is at said second position based on said lens position coefficient;

means for reflecting light from a photographer eye; and means for detecting a position of light reflected from the photographer eye and for providing an output based on said position wherein said means for determining said visual line position determines said visual line position as a function of said output and said correction coefficients wherein said means for determining said visual line position determines said visual line position, Y', at said second position according to the following equation:

$$Y'=(A \cdot m) \cdot X+(A \cdot n)$$

where A is said lens position coefficient at said second position of said lens, m and n are said correction coefficients determined at said first position of said diopter adjustment lens, and X is said position of reflected light at said second position of said diopter adjustment lens.

2. A camera according to claim 1, further comprising means for storing data of said first position of said diopter adjustment lens and said correction coefficients of said diopter adjustment lens in said first position.

3. A camera according to claim 2, further comprising means for writing said data and said correction coefficients for said first position in said storing means, and means for reading said stored data and said stored correction coefficients from said storing means when said lens is at said second position.

4. A camera according to claim 1, further comprising means for aligning the photographer's vision with displayed points at predetermined visual line positions.

5. A method of determining a visual line position in a camera to determine a photographer's visual line, the camera including a diopter adjustment lens movable along an optical axis, wherein said method comprises the steps of:

detecting a first position of said diopter adjustment lens;

making visual line position determinations at said first position of said diopter adjustment lens;

moving said diopter adjustment lens to a second position along said optical axis;

detecting said second position;

determining a distance between said first position and said second position; and determining a visual line position at said second position based on (1) said visual line position determinations made at said first position, and (2) said distance;

determining, with said diopter adjustment lens at said second position, a lens position coefficient from said distance;

determining said visual line position based on said lens position coefficient;

determining correction coefficients for correcting determinations of visual line positions perpendicular to the optical axis, wherein values of said correction coefficients depend on characteristics of a photographer eye in said first position;

adjusting at least one of said correction coefficients when said diopter adjustment lens is at said second position based on said lens position coefficient;

reflecting light from the photographer eye;

detecting a position of light reflected from the photographer eye and providing an output based on said position of reflected light;

determining said visual line position as a function of said output and said correction coefficients; and with said diopter adjustment lens at said second position, the step of determining said visual line position, Y', at said second position according to the following equation:

$$Y'=(A \cdot m) \cdot X+(A \cdot n)$$

where A is said lens position coefficient at said second position, m and n are said correction coefficients determined at said first position, and X is said position of reflected light.

6. A method according to claim 5, further comprising the step of storing data of said first position and said correction coefficients of said diopter lens in said first position.

7. A method according to claim 6, further comprising, with said diopter adjustment lens at said second position, the steps of:

reading said data of said first position and said correction coefficients for said first position; and determining said lens position coefficient based on said data.

8. A method according to claim 5, further comprising the step of aligning the photographer's vision with displayed points at predetermined visual line positions with said diopter adjustment lens at said first position.

9. A camera, comprising:

a diopter adjustment lens movable along an optical axis;

a lens position detection device that detects the position of said diopter adjustment lens along said optical axis;

a visual line position determining device communicating with said lens position detection device, said visual line position determining device determining a photographer visual line position with said diopter adjustment lens at at least a first position and a second position along said optical axis, said visual line position determining device determining said photographer visual line position with said diopter adjustment lens at said second position based on (1) visual line position determinations made by said visual line position determining device with said lens at said first position along said optical axis, and (2) a distance between said first position and said second position detected by said lens position detection device, wherein said visual line position determining device comprises a visual line position correction device that determines a lens position coefficient from said distance detected by said lens position detection device, wherein, when said diopter adjustment lens is at said second position, said visual line position determining device determines said visual line position based on said lens position coefficient, said visual line position determining device determining correction coefficients for correcting determinations of visual line positions perpendicular to the optical axis, and wherein values of said correction coefficients depend on characteristics of a photographer eye in said first position, said visual line position determining device adjusting at least one of said correction coefficients when said diopter adjustment lens is at said second position based on said lens position coefficient;

a light emitter that emits light that is projected onto an eye section of the photographer eye;

a sensor that detects a position of light reflected from the photographer eye and that provides an output based on said position; and a visual line algorithm unit that determines said visual line position as a function of said output and said correction coefficients, wherein said visual line algorithm unit determines said visual line position, Y', at said second position according to the following equation:

$$Y'=(A \cdot m) \cdot X+(A \cdot n)$$

where A is said lens position coefficient at said second position of said diopter adjustment lens, m and n are said correction coefficients determined at said first position of said lens, and X is said position of reflected light at said second position of said diopter adjustment lens.

10. A camera according to claim 9, further comprising a memory device that stores data of said first position of said diopter adjustment lens and said correction coefficients of said diopter adjustment lens in said first position.

11. A camera according to claim 10, wherein said controller writes said data and said correction coefficients for said first position in said memory device, and, when said diopter adjustment lens is at said second position, reads said stored data and said stored correction coefficients from said memory device.

12. A camera according to claim 9, further comprising a screen including indicia defining points with which the photographer can align his vision to determine visual line positions.

13. A camera according to claim 10 wherein said memory device comprises an EEPROM.

* * * * *